July 24, 1934.  C. A. RALL  1,967,325
MOTOR
Filed Aug. 13, 1932   2 Sheets-Sheet 1
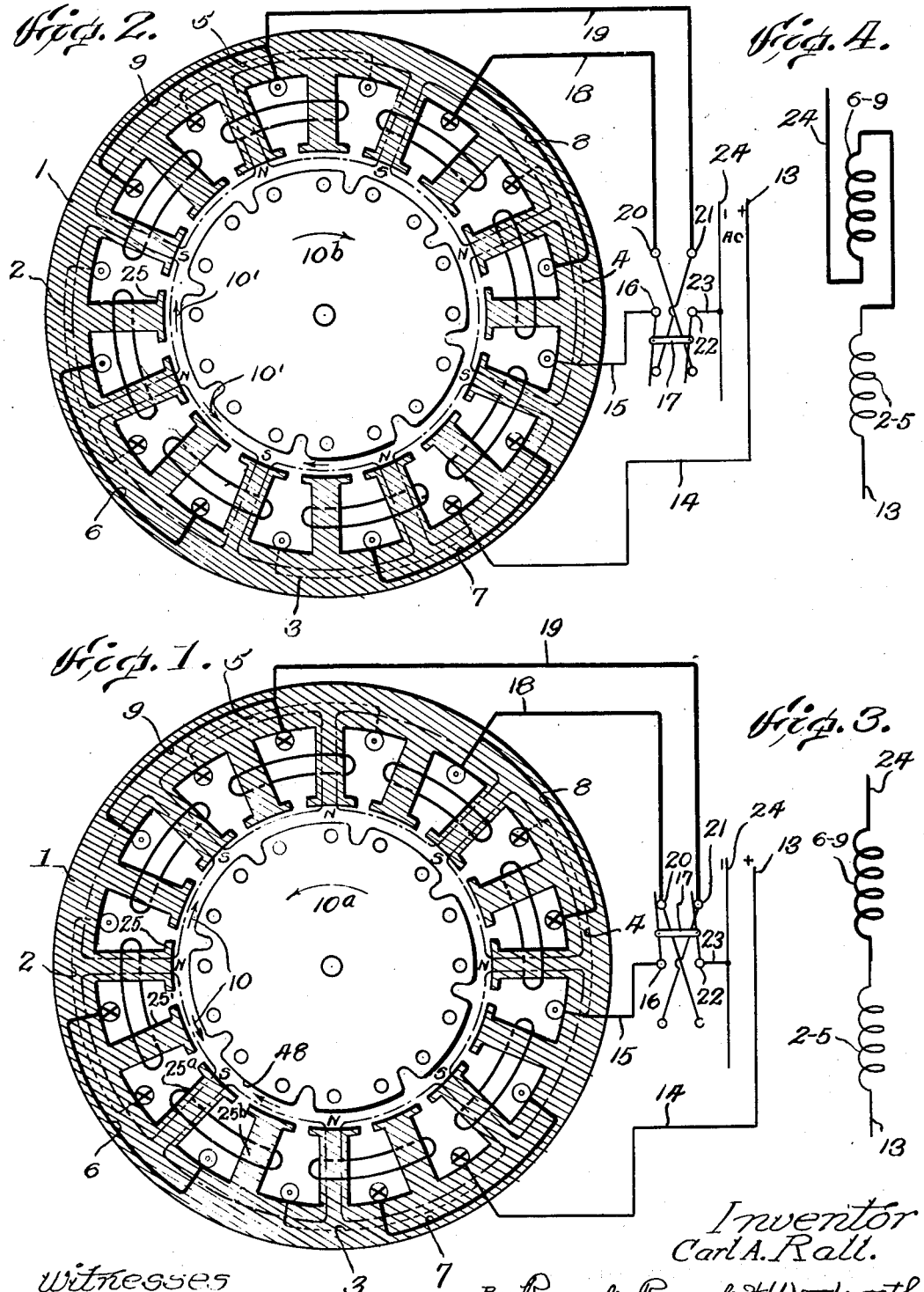
Witnesses
Arthur M. Franke.
Inventor
Carl A. Rall.
By Rummler, Rummler & Woodworth
Attys:

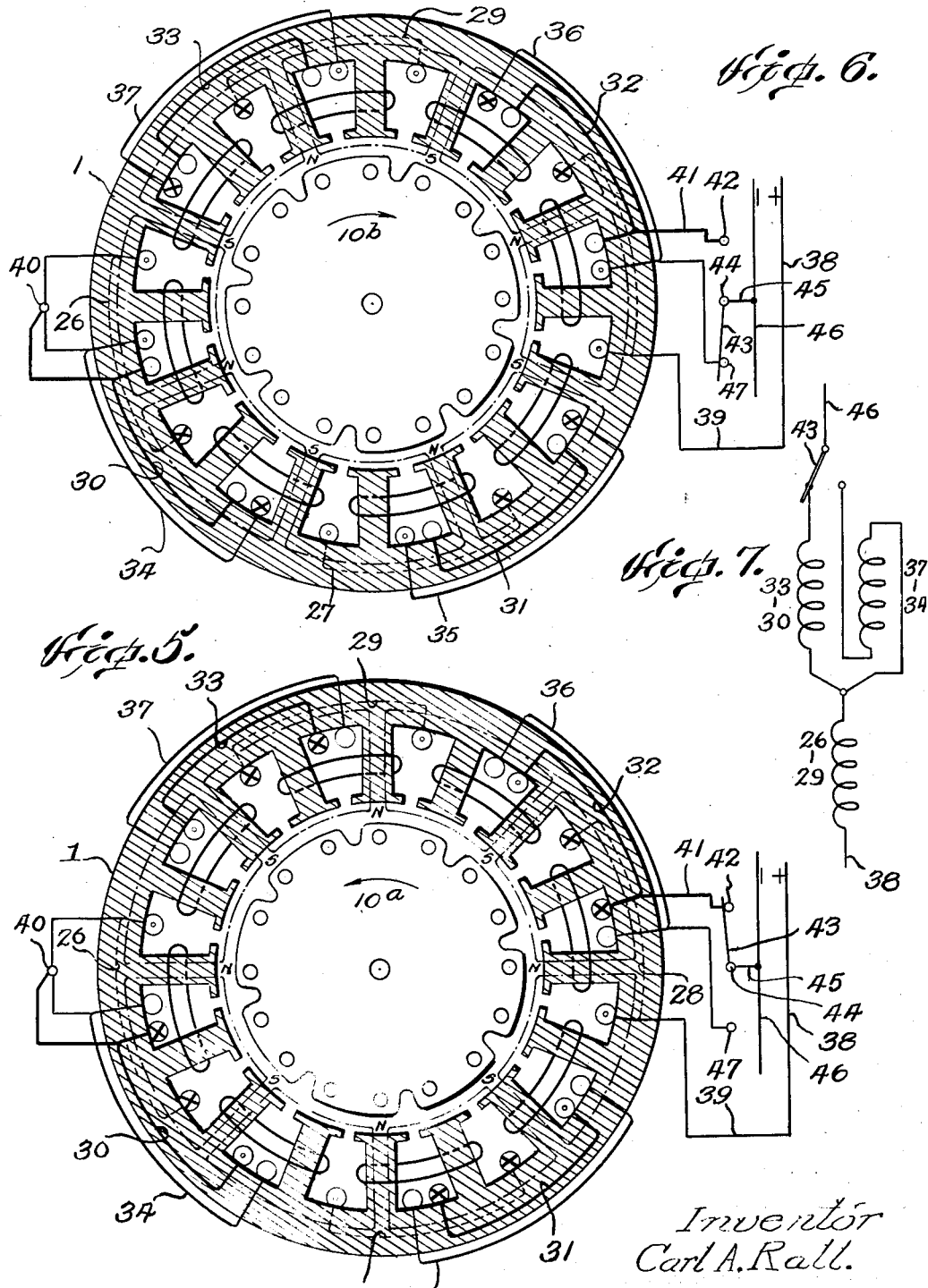

Patented July 24, 1934

1,967,325

UNITED STATES PATENT OFFICE 1,967,325

MOTOR

Carl A. Rall, Chicago, Ill., assignor to Bodine Electric Company, Chicago, Ill., a corporation of Illinois Application August 13, 1932, Serial No. 628,720

6 Claims. (Cl. 172—278)

My invention relates to improvements in reversible electric motors, and more particularly to single phase synchronous motors of the shaded pole type. Heretofore, and up to the present time, reversibility of shaded pole motors has usually been obtained by using, together with the shading coils, two alternative field windings, one arranged to be energized for rotation in each direction respectively, one clockwise and the other counter-clockwise. Single phase motors of this sort are used extensively, especially in small sizes. The main disadvantages of the two-winding direction control shaded pole motor are, first: that in operation, one of the windings is always idle; second: that such motors have low starting torque and low efficiency; and third: that they do not reverse quickly but over-travel many times before they stop and start running in the opposite direction.

The main objects of my invention are to provide an improved reversible motor of the shaded pole variety; to provide such a motor which shall be inexpensive to produce; to provide a field winding system by which reversibility may be accomplished through substantially one distributed and wholly effective, continuous field winding, together with the shading coils; to provide for such a field winding which, excepting the shading coils, shall normally be unitary in operating effect, and electrically continuous for both directions of operation; to provide a motor in which reversibility is accomplished by changing or modifying the relative position of the stator poles to the shading coils; to provide for accomplishing this by mere reversal of connection of part of the field winding; and to provide for increased torque at starting and reversing, especially for the larger sizes.

Two illustrated embodiments of my invention are shown in the accompanying drawings in which:

Figure 1 is substantially a transverse section through the stator of an eight-pole single phase motor, represented somewhat conventionally, the field winding of which has, besides shading coils, two sets of coils which are mutually reversible, the magnetic flux being indicated as for counter-clockwise rotation.

Fig. 2 is similar to Fig. 1, but with the magnetic flux altered and arranged for clockwise rotation, as provided for by operation of a double pole, double throw switch shown diagrammatically beneath the stator.

Fig. 3 is a simplified circuit diagram of the electrical connections shown on Fig. 1.

Fig. 4 is a similar view showing the connections as in Fig. 2.

Fig. 5 is a section taken as in Fig. 1, but with a modified form of field windings, arranged and connected for counter-clockwise rotation.

Fig. 6 is similar to Fig. 5, but shows connections for reversed rotation, as controlled by a single pole, double throw switch.

Fig. 7 is a circuit diagram of the triple field windings and switch used in the embodiments of Figs. 5 and 6.

The preferred form of my invention is shown in Figs. 1 to 4 inclusive. Here the motor comprises an annular stator 1 having sixteen teeth and sixteen slots, and is wound for eight poles. Every slot contains, as part of the field exciting windings, a bundle of copper wire, indicated by a circle in the slot. Where the current is flowing from the observer, a cross is shown within the circle, and a point within the circle indicates that the current is flowing toward the observer.

In this embodiment, each pole has two slots, two bundles of wire such as referred to, one per slot, and two stator teeth, but it is to be understood that the stator might have any number of slots and teeth suitable for an appropriate distributed field winding in accordance with this invention.

The stator winding, aside from the shading coils as shown in Figs. 1 and 2, comprises two sets of coils, thus: coils 2, 3, 4 and 5, shown in light dotted lines, are connected in mutual series and represent one set, while coils 6, 7, 8 and 9, shown in heavy dot and dash lines, also connected in mutual series, represent the other said set of coils. Both of these sets of coils are also connectible one way or the other in series with each other by appropriate switching means, so that in operation, all eight coils representing the eight-pole stator winding are in electrical series, as shown diagrammatically in Fig. 3. The size and diameter of each of these eight coils 2 to 9 is arbitrarily chosen and the coils are distributed so that each and every coil embraces two appropriately positioned teeth. The coils 6 to 9, representing the second set of coils, are displaced one slot, counter-clockwise relative to coils 2 to 5, as in Fig. 1, so that there is a half winding or bundle of series connected conductors in each and every slot, irrespective of shading coils.

As shown in said Fig. 1, there are eight magnetic circuits, each comprising a stator part having two slots. The momentary direction of the magnetic flux, indicated by the arrows 10 on Fig. 1, and 10' on Fig. 2 is controlled by the momentary direction of the field current, which latter direction is indicated in each slot by a cross or by a point. The position of the corresponding north and south poles, indicated by N. and S., is determined by the exciting current in accordance with well known physical laws. In order to make the motor self-starting, I provide eight shading coils, each embracing two teeth. The (north pole) shading coil 11 is placed in the same slots as stator coil 2 while the (south pole) shading coil 12 is placed symmetrically between coils 2 and 3 and occupies the same slots as adjacent parts of adjacent (north) pole shading coils. The other shading coils are placed in a similar manner, as shown in Fig. 1. These shading coils may be of any appropriate design, as understood in the art, the dominant characteristics being that they are in effect short circuited coils embracing the several polar elements respectively, the latter being double toothed in the present instance.

The field circuit is formed by connecting one side of the main power line 13 through the lead 14 to stator coil 3, and thence through one set of coils 2, 5 and 4 to lead 15, which is connected to the upper center contact 16 of a double pole, double throw switch 17. The other set of stator coils 6 to 9 inclusive is connected through the leads 18 and 19 to the right side contacts 20 and 21 respectively of said switch 17. The other center contact 22 of said switch is connected through the lead 23 to the opposite side or conductor 24 of the A. C. power line 23—24.

Throwing the switch 17 from one side to the other reverses the relative instantaneous direction of current flow through the two said sets of coils 6 to 9, and 2 to 5; and by my invention reversibility of rotor movement is thus obtained, as will be more fully explained, simply by reversing the direction of flow through one part of the stator windings.

In operation, with the circuit closed as in Fig. 1, the series windings tend to produce simple, one-toothed poles, arranged alternately, north and south, with magnetically neutral teeth interposed singly therebetween, each pole tooth being embraced by only one of the series coils, and each neutral tooth being embraced ineffectively by oppositely wound exciting coils. But each shading coil 11 embraces both a pole tooth and a neutral tooth, so that when exciting current flows to energize a pole tooth, the shading coil tends to retard its magnetization and at the same time inductively energize the neutral tooth in delayed or out of phase relation thereto, and as the polar flux diminishes in the pole tooth it augments in the normally neutral auxiliary pole tooth, the flux thus advancing from the former to the latter tooth, whereby rotation of the field is very substantially effected.

More in detail, still referring to Fig. 1, tooth 25 primarily constitutes a north pole energized by coil 2, the next leftwardly adjacent tooth 25' being substantially neutral as it is oppositely and equally acted upon by coils 2 and 6. But as the flux rises in tooth 25, in the first half cycle, the double tooth shading coil 11 reacts inductively and by reason of the current generated therein, first retards north polarity in tooth 25' and then gradually induces such polarity therein, and in effect finally transfers the north pole flux from tooth 25 to tooth 25', thus establishing counter-clockwise field rotation and corresponding torque, as indicated by the arrow 10a.

Then in the second half cycle when the exciting current reverses and flows oppositely in the coils 2 to 9, as in Fig. 2, the same action occurs again except that tooth 25 is then a south pole member and a reverse flux advances from tooth 25 to tooth 25'. The other corresponding coils operate in like manner on the teeth embraced thereby. Hence there is a continuous field rotation and torque always in the same direction. This rotary field would act effectively on a squirrel-cage rotor, substantially as in an induction motor, if desired.

Whenever the motor is to be reversed, that is to say for clockwise operation, as illustrated in Fig. 2, the switch 17 is thrown to the left, as shown in said view, whereupon the two coils, 2 and 11, cooperate to produce a north pole at 25', this tooth being embraced by both coils 2 and 6, which now carry current in the same direction. Each adjacent tooth 25 and 25a is embraced by a single one of these coils respectively which tends similarly to magnetize the same. The next tooth 25b is embraced only by a presently south pole shading coil 12 and serves as a south pole.

As the current rises simultaneously in the coils 2 and 6, the north pole flux increases in tooth 25'. This, however, operates inductively to produce an opposite lagging current in the shading coil 11, which in turn tends initially and continues to retard the north pole flux in tooth 25, until the current starts to diminish in coils 2 and 6, whereupon the reversed induced current now in the shading coil 11 tends to develop north pole flux in tooth 25, whereby in effect this flux is gradiently transferred progressively from tooth 25' to tooth 25, which being in a clockwise direction, tends to produce a corresponding torque, as a result of which, the motor reverses and runs clockwise as indicated by the arrow 10b. This continuously successive operation and this induced lag of flux progressively, as just described, applies to the rest of the stator, as will be understood.

Referring now to the modification shown in Figs. 5, 6 and 7, the same stator frame 1 is here used, together with the same shading coils, shaped and arranged as above described, but in this embodiment there are used three instead of two sets of exciting windings, two of which are connectible alternatively for corresponding opposite directions of rotation.

The first set of stator exciting coils 26, 27, 28 and 29, is placed and connected like coils 2, 3, 4 and 5 respectively in Figs. 1 and 2; the second set, 30, 31, 32 and 33, is placed like coils 6, 7, 8 and 9 respectively in Figs. 1 and 2; and the third set, 34, 35, 36 and 37, is placed in the same slots with the second set, 30 to 33 inclusive. The eight resulting magnetic circuits are the same in both embodiments, the substantial difference in effect being that in the second embodiment reversal is accomplished by the alternative connection of oppositely wound sets of coils, each connected in series with the said first set of coils according to the rotative direction desired and the corresponding setting of the control switch; this being in place of merely reversing the relative direction of flow in one set of coils relative to the other as provided for in the first embodiment.

In operation only eight exciter coils are ever in use at one time, as for instance in Figs. 5 and 7. Here one side of the main line 38 is connected by the lead 39 to the first set of stator windings 26 to 29, thence therethrough to a common point or connector 40 for all three windings, and thence through the second set of coils 30 to 33 to a lead 41 and thence to the right contact 42 of a double throw single pole switch 43. This switch is connected through the center switch contact 44 and by the lead 45 to the other side 46 of the A. C. power line 38—46.

By this arrangement I am enabled to use a single pole double throw reversing switch which will complete the circuit either through the second set or the third set of windings in series with the first set of stator field windings. The electromagnetic effect is substantially the same as in the design of Figs. 1 and 2.

Since in Fig. 5 no current is formed in the third set of stator windings 34 to 37 as indicated in the drawings by absence of either crosses or points, the magnetic conditions in Fig. 5 are a duplicate of those shown in Fig. 1; and an induction rotor placed in the resulting stator field will revolve in the counter-clockwise direction as indicated.

Fig. 6 shows the magnetic conditions when the reversing switch is thrown to the other (left) side. A current then flows from the main line conductor 38 by lead 39 through the first set of coils 26 to 29, to the common point 40 and thence through the third set of stator windings 34 to 37 and to the left switch contactor 47, and thence to the main power lead 46. In this arrangement coils 30 to 33 carry no current. An induction rotor put in the stator as thus excited tends to revolve clockwise under substantially the same magnetic forces or conditions as indicated in Fig. 2. Numeral 48 indicates the rotor.

From the foregoing description it will be seen that a device constructed according to my invention represents a reversible shaded pole motor which does not require the use of two separate and identical stator windings such as are necessary in the common form of reversible shaded pole motors. Furthermore, this motor is more efficient and powerful than a corresponding size of motor would in the customary old way. The first form (see Fig. 1), using a two-pole double throw switch gives fifty percent more winding space and thus allows the use of a larger wire and more turns, which cuts down the current and wattage. This motor may be used wherever a reversible shaded pole motor is desired. One particular use for which it is especially adapted is where quick reversibility and low speed are required.

It is to be understood that some of the details set forth may be altered or omitted without departing from the spirit of the invention as defined by the following claims.

I claim:

1. A motor of the class described comprising a stator and a rotor one of which includes a multiple pole field member and mutually series duplex windings therefor, and means for reversing the connection of part of said windings relative to the other part, the reversible windings overlapping the others in pairs and so embracing in common a part of the respective core pole piece of each of said coils, and short circuited shading coils for the several poles respectively.

2. A reversible alternating current motor comprising an annular magnetic stator slotted interiorly to provide definite pole pieces generally known as teeth and winding spaces, in combination with one series of windings embracing every second pair of teeth and another series of windings also embracing every second pair of teeth, each fourth tooth of the stator being embraced by a coil of each said series, short circuited shading coils embracing alternate pairs of teeth including the first mentioned pairs, and means to reverse the relative connection of the two said series, whereby the motor may be reversed.

3. In a reversible single phase motor, a magnetic stator ring having inwardly disposed slots and teeth, interconnected windings thereon and lying in said slots to cause and produce magnetic poles on said teeth, and short circuited shading coils appropriately related to said windings and also lying in certain of said slots to cause rotative movement of the poles and means to reverse the connection of part of said interconnected windings, whereby the motor may be reversed.

4. A motor of the class described, having a duplex series of stator coils arranged and connected to produce a reversible rotating field, together with a shading coil for each stator pole part, a rotor, and a switch for reversing the current flowing through one set of the stator coils.

5. In a motor of the kind described, a plurality of stator coils arranged and connected in two series, said coils being energizable alternatively and being arranged to produce a rotating field dependent for direction on the selective connection of said coils, together with a shading coil for each stator pole, said shading coil having relatively low resistance compared with the series coils, a rotor of relatively high resistance compared with the shading coils, and a single pole double throw switch for selectively energizing one series of said stator coils and de-energizing the other series.

6. An alternating current single phase motor comprising a stator and a rotor, one of which has a magnetic field member which is uniformly slotted and provided with exciting windings and shading coils arranged symmetrically to produce appropriate field polarity, the effective portion of said coils and windings being disposed in appropriate slots, said exciting windings being arranged to jointly embrace two teeth and being electrically connectible one way to cooperatively energize a tooth, and another way to neutralize their effects on the same tooth, said tooth and an adjacent tooth being embraced by a shading coil, the adjacent tooth being embraced also by one of the energizing coils, whereby reversible field rotation may be effected.

CARL A. RALL.